(12) United States Patent
Boeltl

(10) Patent No.: US 12,410,592 B2
(45) Date of Patent: Sep. 9, 2025

(54) WATER PROVIDING STATION

(71) Applicant: Acorn Engineering Company, City of Industry, CA (US)

(72) Inventor: Darryl M. Boeltl, Whittier, CA (US)

(73) Assignee: Acorn Engineering Company, City of Industry, CA (US)

( * ) Notice: Subject to any disclaimer, the term of this patent is extended or adjusted under 35 U.S.C. 154(b) by 784 days.

(21) Appl. No.: 16/941,043

(22) Filed: Jul. 28, 2020

(65) Prior Publication Data

US 2022/0034073 A1 Feb. 3, 2022

(51) Int. Cl.
| | | |
|---|---|---|
| *E03B 9/20* | (2006.01) | |
| *B01D 29/13* | (2006.01) | |
| *B01D 35/30* | (2006.01) | |
| *C02F 1/00* | (2023.01) | |
| *C02F 101/12* | (2006.01) | |
| *C02F 101/20* | (2006.01) | |
| *C02F 101/30* | (2006.01) | |

(52) U.S. Cl.
CPC ............... *E03B 9/20* (2013.01); *B01D 29/13* (2013.01); *B01D 35/306* (2013.01); *C02F 1/001* (2013.01); *B01D 2201/04* (2013.01); *B01D 2201/4092* (2013.01); *C02F 2101/12* (2013.01); *C02F 2101/20* (2013.01); *C02F 2101/306* (2013.01)

(58) Field of Classification Search
CPC .. E03B 9/20; E03B 7/07; B01D 29/13; B01D 35/306; B01D 2201/04; B01D 2201/4092; B01D 27/08; B01D 2201/0423; B01D 2201/303; C02F 1/001; C02F 2101/12; C02F 2101/20; C02F 2101/306; C02F 2201/006; C02F 2307/10; C02F 1/003
See application file for complete search history.

(56) References Cited

U.S. PATENT DOCUMENTS

| | | | | |
|---|---|---|---|---|
| 2,033,083 | A * | 3/1936 | Roberge | E03B 9/20 |
| | | | | 239/29 |
| 4,942,630 | A * | 7/1990 | Kantor | B01D 29/96 |
| | | | | 4/496 |
| 7,056,435 | B2 * | 6/2006 | Jenkins | B01D 35/30 |
| | | | | 210/232 |
| 10,710,010 | B1 * | 7/2020 | Bagnall | B01D 35/306 |

FOREIGN PATENT DOCUMENTS

| | | | | |
|---|---|---|---|---|
| BR | 202015019346 U2 * | 2/2017 | | |
| CN | 1896661 A * | 1/2007 | .......... | F25D 23/126 |
| CN | 105585165 A * | 5/2016 | | |

OTHER PUBLICATIONS

English translation of CN-1896661 (Year: 2007).*

* cited by examiner

*Primary Examiner* — Qingzhang Zhou
(74) *Attorney, Agent, or Firm* — Honigman LLP; Eric J. Sosenko; Jonathan P. O'Brien

(57) ABSTRACT

A water providing station having a housing that supports a basin. A water dispensing mechanism is associated with the basin and is coupled to a water supply line located within the housing. A filter is also coupled to the water supply line. Mounted to a portion of the housing is a door that is moveable between open and closed positions. The filter is mounted to and supported by the door for movement moved with the door between the open and closed positions.

19 Claims, 7 Drawing Sheets

WATER PROVIDING STATION

BACKGROUND

Field of the Invention

The present invention generally relates to water providing stations, such as drinking fountains, water bottle filling stations and hand washing stations. More specifically, the invention relates to a water providing station for use in providing filtered water for drinking, bottle filling, hand washing or other purposes.

Description of Related Art

Water providing stations, such as but not limited to, drinking fountains, water bottle filling stations, hand washing stations, etc., are all coupled to water supplies to provide clean and safe tap water to the user. While such water supplies, typically a municipal water supply, generally provide good and safe water, the quality of the water may and can be improved.

To improve the quality of the water, a variety of filters exist that can be incorporated into a water supply station. The construction and materials of the filter will vary depending on the particular contaminant(s) that are intended to be removed from the water. Common contaminants that are often of concern include, without limitation, chlorine, lead, mercury, pesticides and herbicides.

One common type of filter is the screw-on filter cartridge. The filter is installed and removed from the water supply station by incorporating a filter head into the water supply line. The cartridge is provided with integral fittings and a threaded connector thereby allowing the cartridge to be mounted to a corresponding threaded connector provided on the filter head. In this way, the filter can be easily removed from the water supply once its service life is complete and replaced with a new filter.

The replacement of the filter still requires the removal of an access panel from the water providing station to expose an access opening into the station and to expose the filter. The service technician also must reach through the opening to access the filter, manipulate the filter to release it from the filter head, and retract the filter through the opening. The new filter is similarly installed in a reverse ordered process until the access panel cover is repositioned and secured over the access opening.

SUMMARY

In overcoming the various drawbacks and other limitations of the related art, the present invention provides a water providing station in which access to a replaceable filter is made easier and more efficient. This is achieved, in one aspect of the invention, by the filter being mounted to a drop-down door and moveable with the door to an easy access position.

Accordingly, in one aspect, the invention provides a water providing station having a housing that supports a basin. A water dispensing mechanism is associated with the basin and is coupled to a water supply line located within the housing. A filter is also coupled to the water supply line. Mounted to a portion of the housing is a door that is moveable between open and closed positions. The filter is mounted to and supported by the door for movement moved with the door between the open and closed positions.

In another aspect, the door is pivotally mounted to the housing.

In a further aspect, one end of the door is pivotally engaged with the housing and at another portion of the door the door is releasably engaged with the housing.

In an additional aspect, a filter hub, coupled to the water supply line, is engaged with the filter and defines a fluid connection between the filter and the water supply line.

In still another aspect, the filter hub is supported by the door.

In yet a further aspect, the filter hub is fixedly fastened to the door for movement with the door between the open and closed positions.

In an additional aspect, the filter hub is in threaded engagement with the filter.

In yet another aspect, the door is pivotally engaged adjacent to one end of the door.

In still a further aspect, the door includes a main panel defining an exterior surface, the exterior surface corresponding with an exterior surface of the housing in the closed position.

In an additional aspect, the exterior surface is flush with the exterior surface of the housing in the closed position.

In another aspect, the door includes a mounting bracket, the filter being connected to the mounting bracket.

In a further aspect, the filter is indirectly connected to the mounting bracket.

In yet an additional aspect, the mounting bracket extends away from the main panel on a side of the main panel opposite from the exterior surface of the main panel.

In another aspect, a filter hub, the filter hub being mounted to the mounting bracket.

In yet a further aspect, the filter hub is connected to the filter and indirectly connects the filter to the mounting bracket.

In still an additional aspect, the door includes lateral flanges adjacent to at least one end of the door, the door being mounted to the housing by pivot pins extending through the lateral flanges.

In yet another aspect, the filter includes coupling port and a body portion, the body portion being supported by the door.

In a further aspect, the door includes a main panel having support shelves provided along at least portions of lateral sides of the main panel.

In an additional aspect, the filter engages the support shelves.

In still another aspect, the body of the filter engages the support shelves.

Further objects, features and advantages of this invention will become readily apparent to persons skilled in the art after review of the following description, including the claims, and with reference to the drawings that are appended to and form a part of this specification.

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part, whether or not such an axis is designated in the figures. An axial surface is therefore one that faces in the axial direction, a direction along the central axis. A radial surface therefore faces radially, generally away from or toward the central axis. It will be understood, however, that in actual implementation, the directional references used herein may not necessarily correspond with the installation and orientation of the corresponding components or device.

Figure 1:
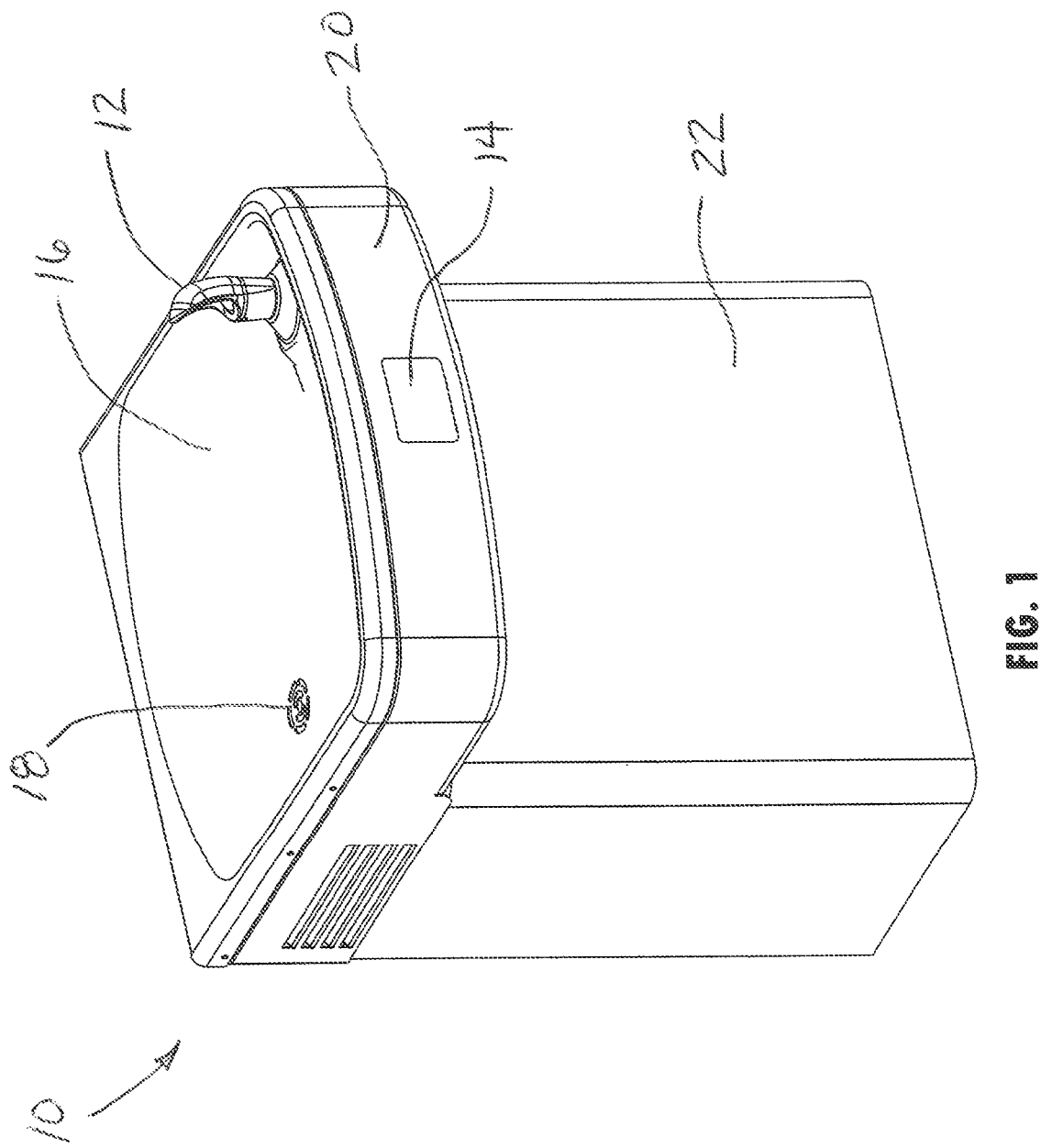
FIG. 1 is a perspective view of a incorporating the principles of the present invention.
Figure 2:
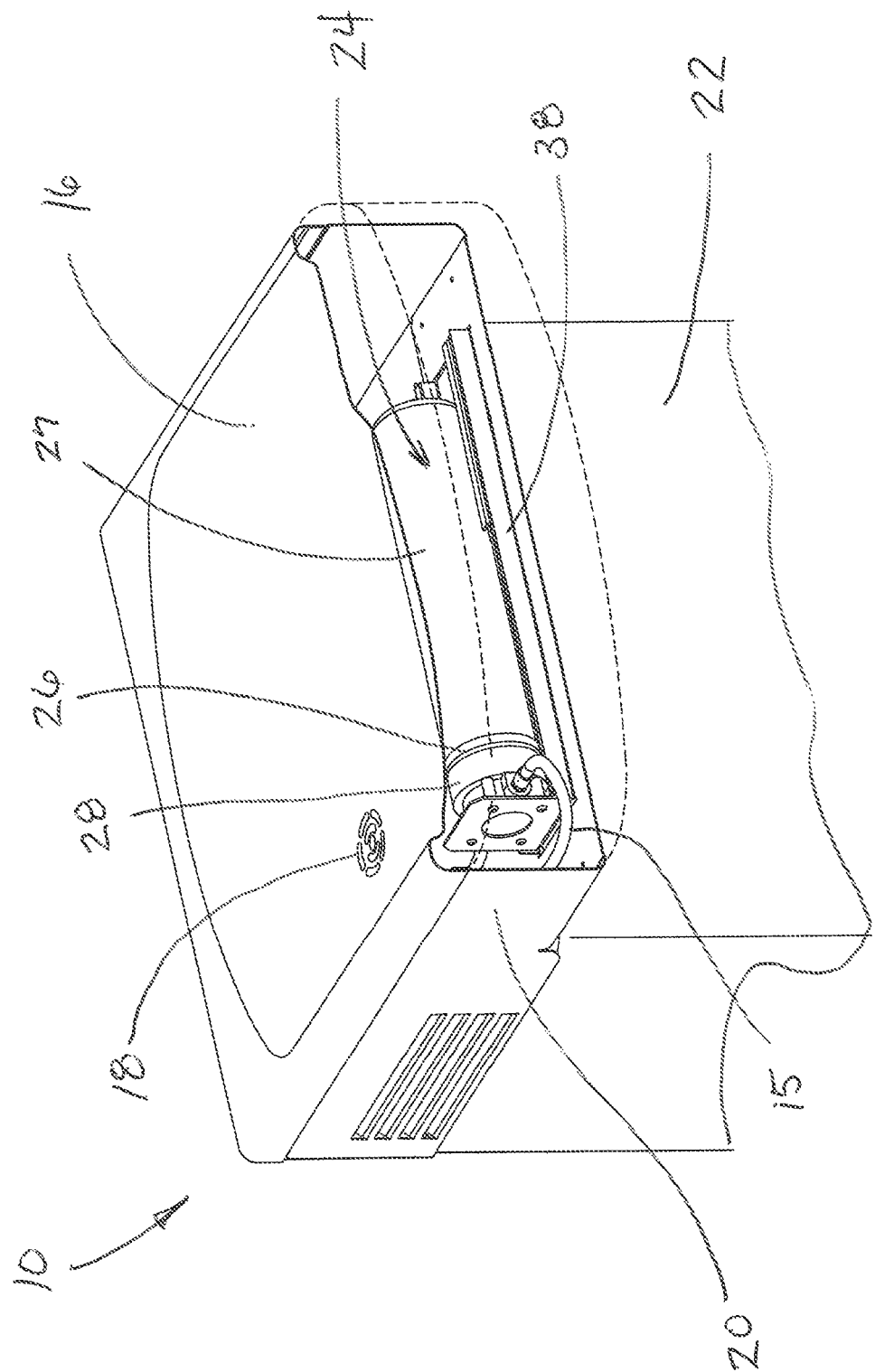
FIG. 2 is a perspective view of the water providing station seen in FIG. 1, with portions broken away and shown in phantom to reveal a filter located within the water providing station.
Figure 3:
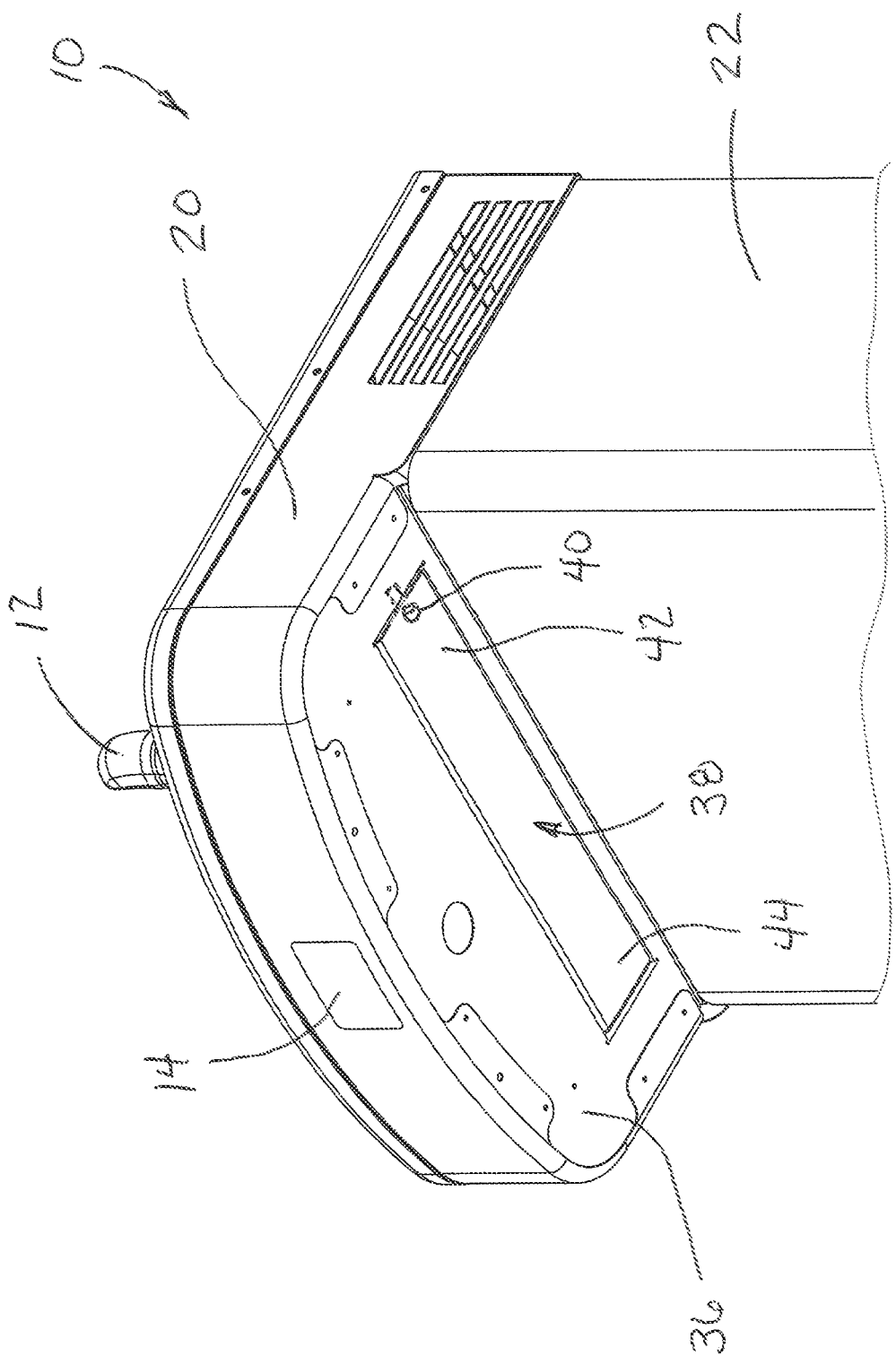
FIG. 3 is perspective view of the underside of the water providing station and illustrates the hinged filter door in a closed position.

Referring now to the drawings, a water providing station, hereafter "water station," embodying the principles of the present invention is generally illustrated in FIGS. 1-3 and designated at 10. As seen in the figures, the water station 10 is shown as a drinking fountain. This is for illustration purposes only and is not intended to limit the scope or application of the principles of the present invention. As will be appreciated, the principals of the present are equally applicable to other types of water stations, including, without limitation, water bottle filling stations, glass filling stations, hand washing stations, etc.

As seen in the figures, the water station 10 includes a bubbler 12 that provides water on demand for drinking purposes. The bubbler 12 is typical on drinking fountains, but would be omitted and replaced with a faucet or other water dispenser in other types of water stations. The on demand aspect of the water station 10 is achieved via a pushbutton and valve assembly 14 connected to a water supply line 15 (seen in FIG. 2) that is further coupled via an inlet connector (not shown) to a potable water source, such as a municipal water source (also not shown). The bubbler 12 provides the water upward and out over a basin 16, which collects the excess water and directs it to a drain opening 18 in the basin 16. Water from the drain opening 18 is collected in drain line (not shown) that may include a tailpipe coupled through a P-trap coupled to a waste pipe extending from a wall to which the water station 10 is mounted. Alternatively, the water station 10 may be free standing and both the water source and waste pipe may emerge from the ground or an alternate location 12. The various plumbing components of the water station 10 are enclosed in a housing 19, generally comprised of an apron 20 and a cover 22, upon which the basin 16 is supported.

As seen in FIG. 2, the water station 10 is includes an internally located filter 24. The filter 24 is provided in-line with the water supply line 15 upstream of the bubbler 12 or other water dispenser. Preferably, the filter 24 is a screw-on, cartridge-type filter in which both the inlet and outlet of the filter 24 are located centrally of a threaded coupling 26 on one end of a body 27 of the filter 24. Alternatively, the filter 24 may be provided in-line with the water supply line 15 through compression fittings, barbed fittings, clamp fittings, quick connect and other similar and/or conventional fittings.

The filter 24 is connected to the water supply line 15 through a filter hub 28 that includes a threaded coupling 30 that matingly engages the threaded coupling 26 of the filter 24. The filter hub 28 also includes inlet and outlet ports 32, 34 that couple with the inlet and outlet ports of the filter 24 during engagement of the threaded couplings 26, 30 and provide for fluid communication between the filter hub 28 and the filter 24. Because of the threaded couplings 26, 30, the filter 24 is readily disconnected from the water supply line 15 after its useful life and replaced with another filter 24.

However and as previously mentioned, access to a filter in prior water stations was cumbersome and inconvenient. In accordance with the principles of the present invention, access to the filter 24 is easily gained and removal and replacement of the filter 24 is readily achieved.

Referring now to FIG. 3, provided in a bottom wall 36 of the apron 20 is a door 38. The door 38 is hinged at one end and releasably engaged at the other end with the bottom wall 36. As seen in FIG. 3, the door 38 is in the closed position and a locking mechanism 40, such as a simple lock set, secures a distal end 42 of the door 38 with the bottom wall 36. While not readily seen in FIG. 3, the proximal end 44 of the door 38 is pivotally connected with the bottom wall 36 so as to allow the distal end 42 of the door 38 to swing downward into an open position when the locking mechanism 40 is unlocked. The open positon of the door 38 is seen in FIGS. 4A and 4B.

Figure 4A:
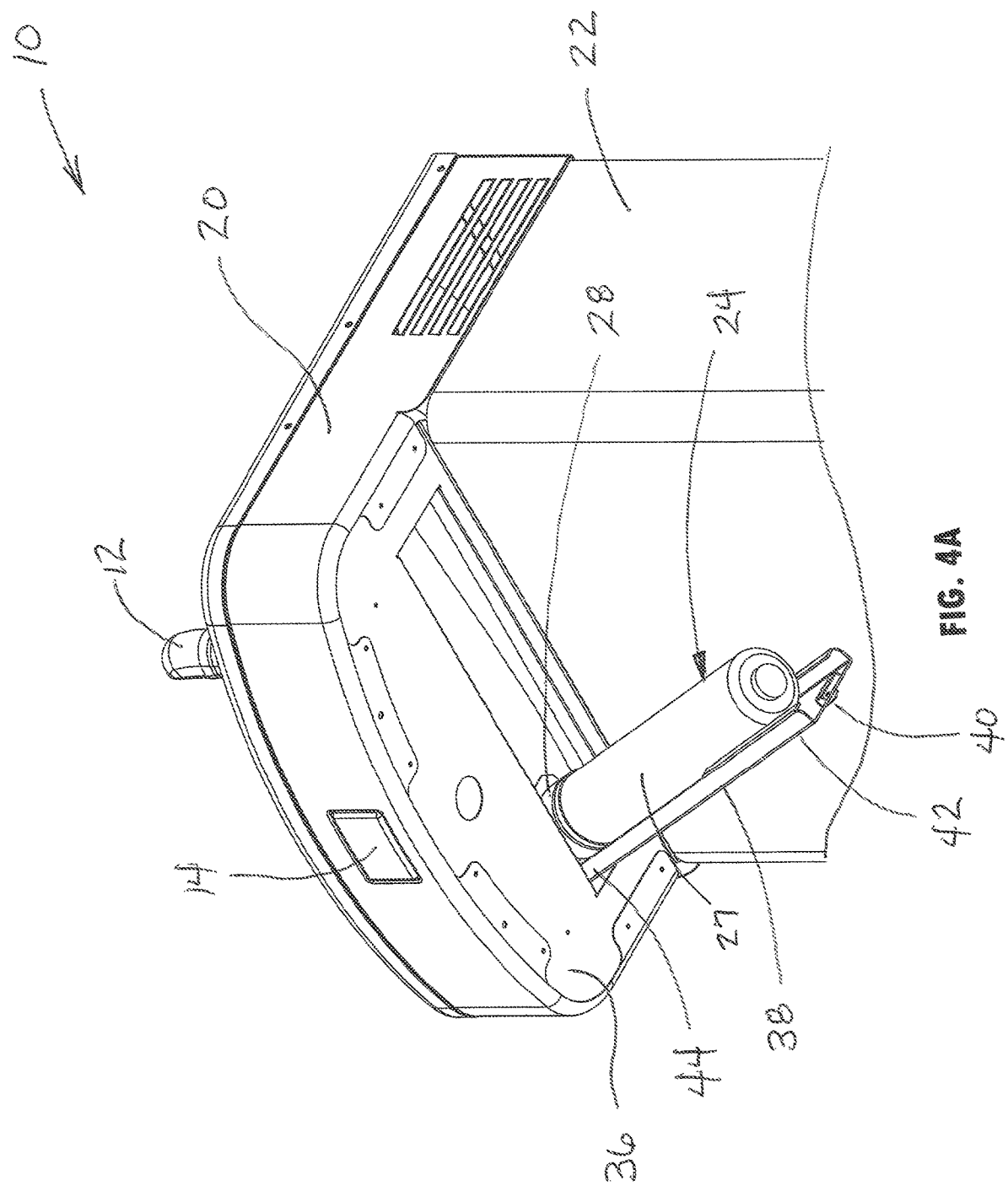
FIG. 4A is view similar to FIG. 3, with the filter door in an open position.
Figure 4B:
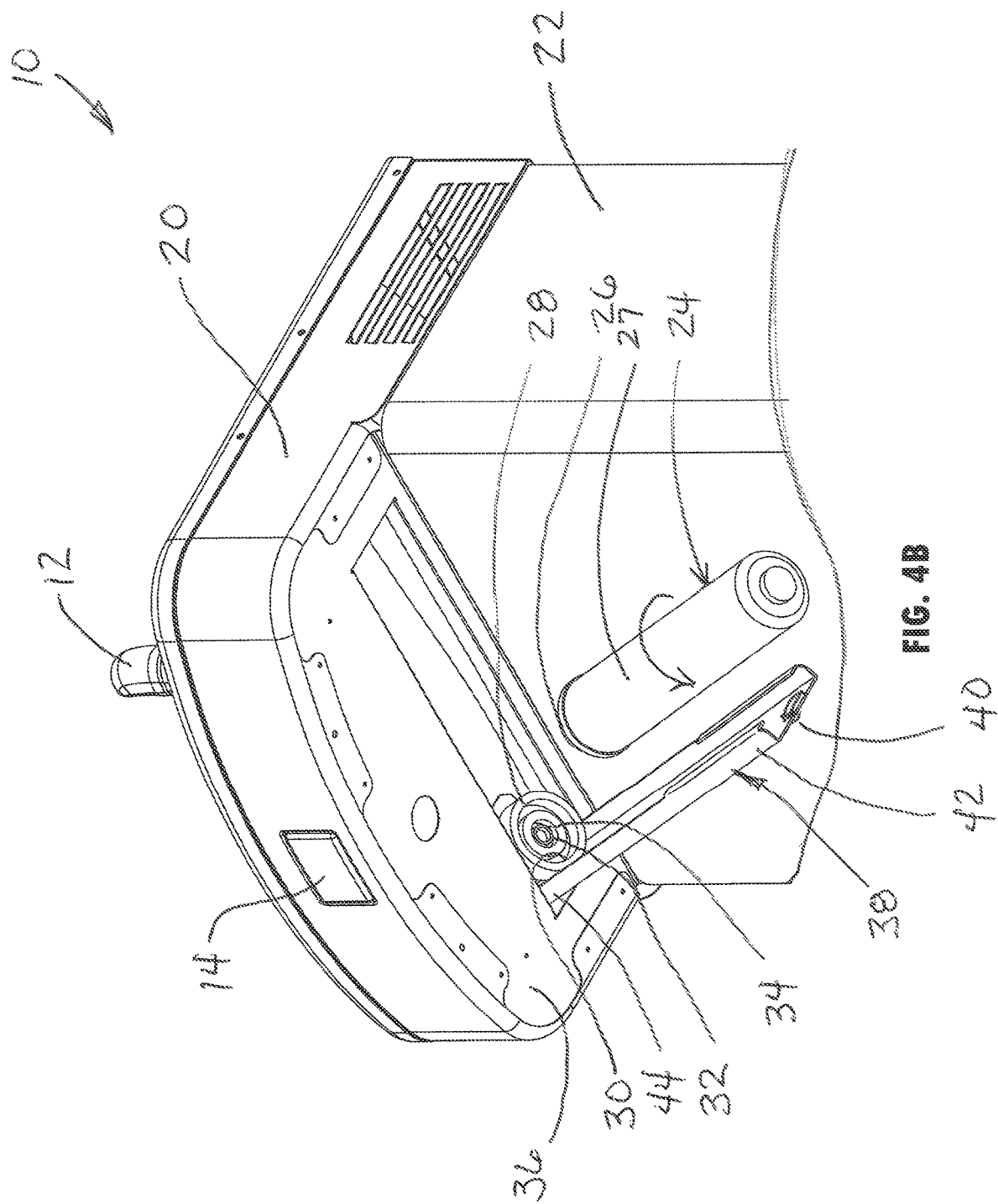
FIG. 4B is view similar to FIG. 4B, with the filter removed from the open filter door.

As seen in FIG. 4A, the filter 24 is carried by the door 38 and is pivoted downward, into an easily accessible positon, when the door 38 is moved into its open position. To facilitate this movement, the filter hub 28 is mounted to the proximal end 44 of the door 38, also for movement with the door 38. To remove the filter 24, the filter 24 is rotated counter-clockwise, as indicated by arrow 46 in FIG. 4B, thereby unthreading the threaded coupling 26 of the filter 24 from the threaded coupling 30 of the filter hub 28. To install a replacement filter 24, the process is simply reversed and the filter 24 is rotated clockwise, in a direction opposite to arrow 46, thereby threading the threaded coupling 26 of the filter 24 into engagement with the threaded coupling 30 of the filter hub 28.

Figure 5:
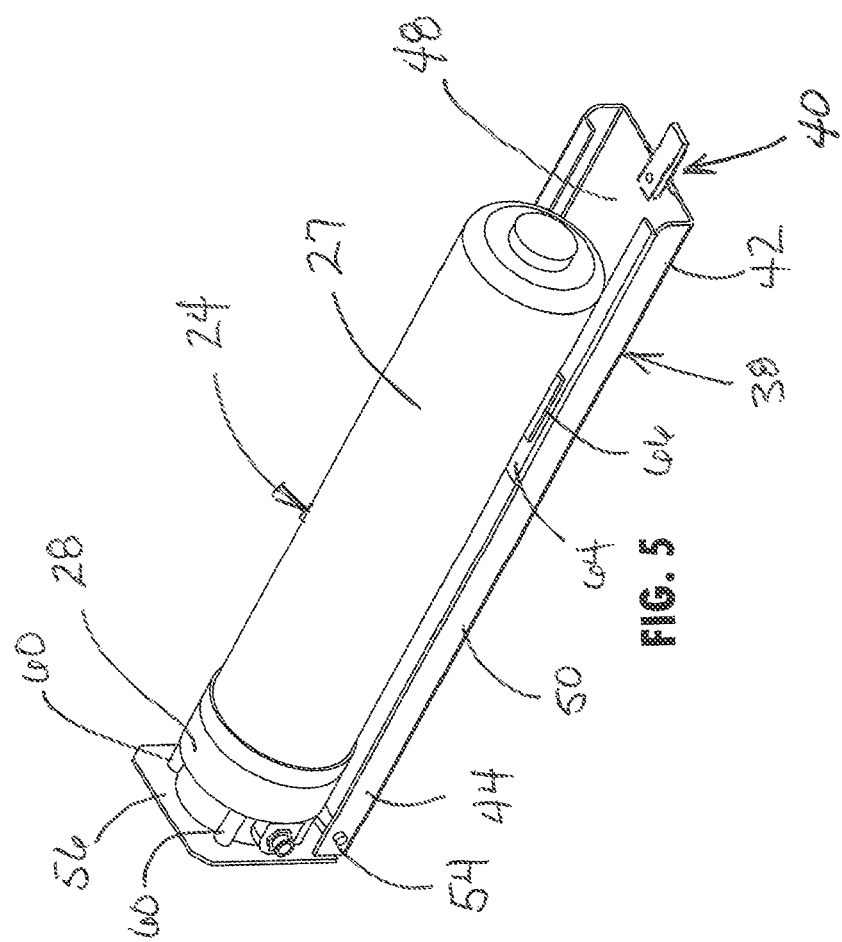
FIG. 5 is a perspective view of the filter and filter door isolated from water providing station.
Figure 6:
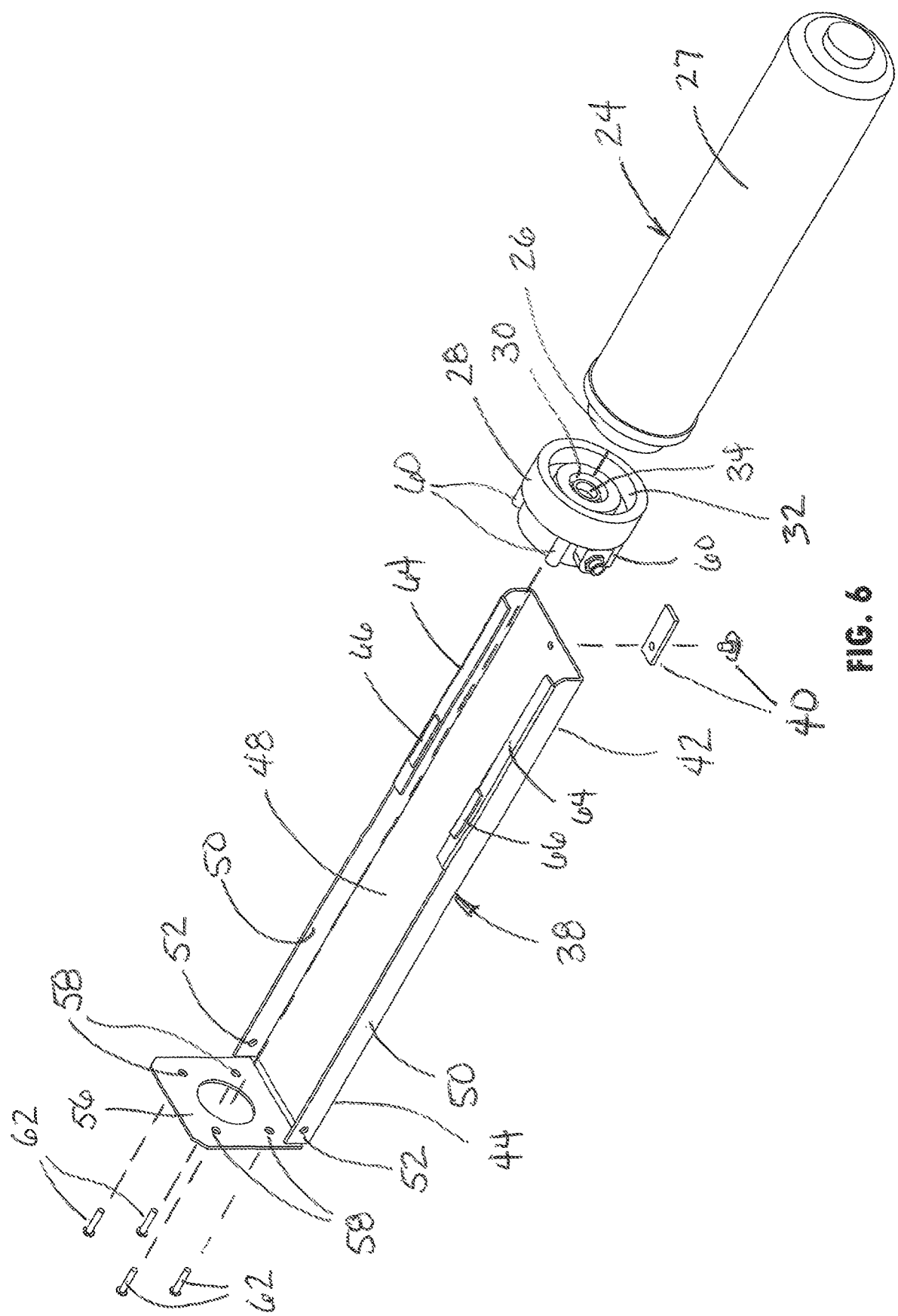
FIG. 6 is an exploded perspective view of the filter and filter door seen in FIG. 5.

Referring now to FIGS. 5 and 6, the filter 24, filter hub 28 and door 38 are shown removed from the remainder of the water station 10. As seen therein, the door 38 includes a main panel 48 that defines a surface that is flush with the bottom wall 36 of the apron 20 when the door 38 is in the closed position. At the lateral (lengthwise) sides of the door 38, upright flanges 50 are provided and, at the proximal end 44, the flanges 50 include apertures 52 through which extend pivot axles 54. The pivot axles 54 may be formed by pins extended through the apertures 52 or by other mechanical fasteners, such as partially or fully threaded bolts and retaining nuts. The pivot axles 54 extend laterally outward from the flanges 50 to engage corresponding brackets on the upper (inner) side of the bottom wall 36 to form the pivot engagement between the door 38 and the bottom wall 36 of the apron 20.

Also at the proximal end of the door 38, a flange on the end of the main panel 48 defines a mounting bracket 56 for securing the filter hub 28 to the door 38. The mounting bracket 56 is preferably oriented 90 degrees relative to the main panel 48 so as to extend into the water station 10 when the door 38 is in the closed position. The mounting bracket 56 is provided with apertures 58 that correspond with bores defined in bosses 60 or other features of the filter hub 28 and through which threaded fasteners 62 are inserted to engage within the bores and fixedly secure the filter hub 28 directly to the mounting bracket 56 and, therefore, the door 38. Accordingly, the filter 24 is indirectly connected to the mounting bracket 56, but is supported thereby.

At the distal end 42 of the door 38, the lateral flanges 50 are further formed with inwardly extending flange portions that define support shelves 64. The body 27 of the filter 24 may be received and supported on the support shelves 64 to reduce stress imparted to the threaded couplings 26, 30 when the door 38 is in the closed position. A damping element 66, such as a foam rubber or cork strip, may optionally be provided on the support shelves 64 to cushion the support of the filter 24 and minimize and vibrational noise that might otherwise result via contact between the body of the filter and the support shelves material support shelves 64.

The above description is meant to be illustrative of at least one preferred implementation incorporating the principles of the invention. One skilled in the art will really appreciate that the invention is susceptible to modification, variation and change without departing from the true spirit and fair scope of the invention, as defined in the claims that follow. The terminology used herein is therefore intended to be understood in the nature of words of description and not words of limitation.

I claim:

1. A water providing station configured to be mounted to a wall and comprising:
   a housing;
   a basin directly supported by the housing and being located immediately above the housing;
   a water dispensing mechanism associated with the basin;
   a water supply line located within the housing;
   a filter coupled to the water supply line;
   a door mounted to a portion of the housing, the door being moveable between open and closed positions and extending downwardly from the housing in the open position and being flush with the housing in the closed position; and
   the filter being mounted to the door and supported by the door for movement with the door between the open and closed positions while remaining coupled to the water supply line.

2. The water providing station according to claim 1, wherein the door is pivotally mounted to the housing.

3. The water providing station according to claim 1, wherein one end of the door is pivotally engaged with the housing and at another portion of the door is releasably engaged with the housing.

4. A water providing station comprising:
   a housing;
   a basin supported by the housing;
   a water dispensing mechanism associated with the basin;
   a water supply line located within the housing;
   a filter coupled to the water supply line;
   a door mounted to a portion of the housing, the door being moveable between open and closed positions and extending downwardly from the housing in the open position and being flush with the housing in the closed position; and
   a filter hub supported by the door and being coupled to the water supply line in both the open and closed positions of the door, the filter hub being engaged with the filter and defining a fluid connection between the filter and the water supply line.

5. The water providing station according to claim 4, wherein the filter hub is fixedly fastened to the door for movement with the door between the open and closed positions.

6. The water providing station according to claim 4, wherein the filter hub is in threaded engagement with the filter.

7. The water providing station according to claim 1, wherein the door is pivotally engaged adjacent to one end of the door.

8. The water providing station according to claim 7, wherein the door includes a main panel defining an exterior surface, the exterior surface corresponding with an exterior surface of the housing in the closed position.

9. The water providing station according to claim 8, wherein the exterior surface is flush with the exterior surface of the housing in the closed position.

10. The water providing station according to claim 8, wherein the door includes a mounting bracket, the filter being connected to the mounting bracket.

11. The water providing station according to claim 10, wherein the filter is indirectly connected to the mounting bracket.

12. The water providing station according to claim 10, wherein the mounting bracket extends away from the main panel on a side of the main panel opposite from the exterior surface of the main panel.

13. The water providing station according to claim 10, further comprising a filter hub, the filter hub being mounted to the mounting bracket.

14. The water providing station according to claim 13, wherein the filter hub is connected to the filter and indirectly connects the filter to the mounting bracket.

15. The water providing station according to claim 1, wherein the door includes lateral flanges adjacent to at least one end of the door, the door being mounted to the housing by pivot pins extending through the lateral flanges.

16. The water providing station according to claim 1, wherein the filter includes coupling port and a body portion, the body portion being supported by the door.

17. The water providing station according to claim 16, wherein the door includes a main panel having support shelves provided along at least portions of lateral sides of the main panel.

18. The water providing station according to claim 17, wherein the filter engages the support shelves.

19. The water providing station according to claim 17, wherein the body of the filter engages the support shelves.

* * * * *